United States Patent [19]
Olsen et al.

[11] 3,753,284
[45] Aug. 21, 1973

[54] METHOD FOR REPAIRING INSULATED HIGH VOLTAGE LINE

[75] Inventors: Willi Olsen; Klaus Schlosser, both of Berlin, Germany

[73] Assignee: Siemens Aktiengesellschaft, Berlin & Munich, Germany

[22] Filed: Sept. 15, 1971

[21] Appl. No.: 180,614

[30] Foreign Application Priority Data
Sept. 30, 1970 Germany............... P 20 49 013.5

[52] U.S. Cl............. 29/401, 137/15, 138/97, 174/21 R, 174/99 E, 285/15, 285/39, 285/229
[51] Int. Cl................ H02g 1/00, F16l 55/18
[58] Field of Search............... 174/1, 10, 21 R, 174/21 JS, 21 C, 21 CA, 22 R, 22 C, 37, 68 R, 68 B, 68 C, 84 R, 84 S, 88 R, 88 B, 88 C, 88 S, 98, 99 B, 99 E, 135; 29/628, 630 F, 401, 237; 156/49; 137/15; 138/97; 285/15, 31, 32, 39, 226, 229

[56] References Cited
UNITED STATES PATENTS

| 921,973 | 5/1909 | Gillett et al............... 29/237 |
| 1,197,496 | 9/1916 | Jobling................... 285/229 |
| 1,720,586 | 7/1929 | Allan et al............... 174/99 E UX |
| 2,592,372 | 4/1952 | Altorfer................. 285/229 X |
| 2,701,864 | 2/1955 | Cork et al............... 174/99 E UX |
| 2,823,049 | 2/1958 | Hombach................. 285/31 |
| 2,874,207 | 2/1959 | Schymik................. 174/99 E |
| 3,573,342 | 4/1971 | Graybill et al........... 174/99 E X |
| 3,616,516 | 11/1971 | Corriston............... 138/97 X |

FOREIGN PATENTS OR APPLICATIONS
533,285 | 11/1956 | Canada.................. 285/39

Primary Examiner—Laramie E. Askin
Attorney—Carlton Hill, J. Arthur Gross et al.

[57] ABSTRACT

Simple and efficient repair of a gas insulated high voltage line, wherein the high voltage line and the surrounding insulating gas are encased by a plurality of rigid, tubular, gas tight, metallic casing sections generally fixed in position and arranged in end to end abutment, is made possible by the method of severing one of the casing sections into several pieces by such means as to allow removal of the severed section from between the adjacent abutting sections and replacing the severed casing section with a replacement section having a deformable portion which allows variation in the length of that section over the range of free play required for insertion between the fixed adjacent sections. The high voltage line will be disconnected to allow removal of the severed section. A replacement section comprises a tubular member having ends interconnectable with adjacent mating end portions of an opened line and having a deformable circumferentially extending wall section displaced radially from the surface of said section. A repair piece including the deformable portion may be attached to a piece of the severed section to make up the replacement section.

7 Claims, 1 Drawing Figure

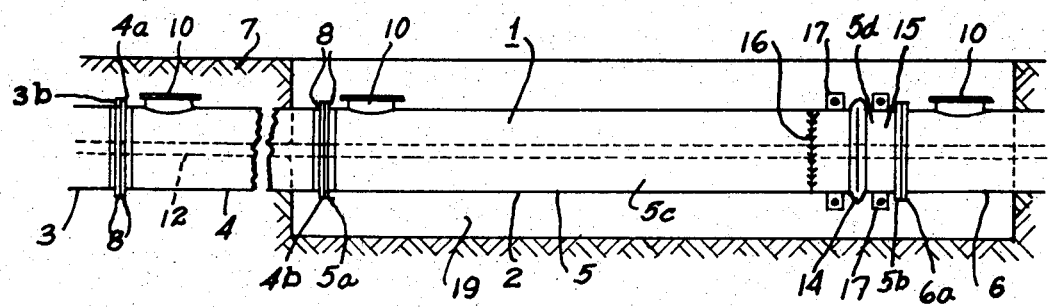

METHOD FOR REPAIRING INSULATED HIGH VOLTAGE LINE

BACKGROUND OF THE INVENTION

1. Field of the Invention

This invention generally relates to high voltage transmission lines and specifically concerns the method and article for repairing the casings of gas pressure insulated high voltage conductors wherein the casing is a plurality of detachable interconnected tubular sections that are ordinarily buried underground. Once the problem area on the high voltage line has been recognized it is important that a simple and efficient means be available to allow the necessary repair as quickly and easily as possible.

2. Prior Art

It is well known in the prior art to insulate electrical high voltage lines by encasing the high voltage conductor in a generally concentric pipe and surrounding it with pressurized gas. In such cases the pipe may consist of a plurality of rigid tubular pieces which are connected in end to end relationship by means of flanges at the ends of the pipe section. The pipeline is initially laid by digging a ditch in the ground and mounting the sections serially one after another with each new section being detachably connected at one end to the end of the previously laid section. While it is relatively simple to mount these sections in position sequentially, it will be understood that difficulties will occur when one of the tubular sections must, for one reason or another, be repaired. It has not been found possible to simply lift the sections up vertically because no interspace is given therefor in the line, but rather the entire tube must be shifted along the electrical connector. Because the usual installation requires in effect a greater opening than was left by the removal of the original pipe section it has been necessary in the past either to arrange the metal pipe so that it could be shifted over its full length to obtain the extra distance which is required for inserting and removing the tubular piece or by providing, at the time of initial installation flexible members inserted at relatively short distances from each other to allow a certain free play in the line. As will be understood by those skilled in the art both of these solutions are very costly, and, in view of the fact that the necessity for repair at any one point on a long line is quite remote, it is highly impractical to design for such improbabilities. With the high voltage line laid underground it is of course almost impossible to allow longitudinal shifting in order to obtain the required movement which will allow replacement. Moreover, even if such movement could be provided it would most likely require complicated and expensive gas seals and undoubtedly require much higher maintenance. As to the provision of flexible members periodically along the line, it may be understood that in addition to the greater expense in production there would be a much higher expense in the installation since it would be required that the flexible members be properly positioned initially and care would have to be taken so that subsequent unwanted flexing would not occur.

SUMMARY OF THE INVENTION

The disadvantages of the prior art are overcome by the method and article of the invention herein whereby the relatively inexpensive conventionally laid pipelines may be efficiently and economically repaired. According to our invention a gas insulated high voltage line in which the high voltage line and pressurized insulating gas are encased by a plurality of rigid, tubular, metallic casing sections arranged end to end with adjacent ends interconnected and gas tight may be repaired by the method comprising the steps of severing one of the casing sections generally circumferentially into first and second pieces to allow removal of the severed section from between the adjacent sections, removing the severed section, effecting the necessary repair, and replacing the severed casing section with a replacement section having a deformable means allowing variation in the length of the replacement section over the range of free play required for insertion and positioning between the adjacent fixed sections. The high voltage line will ordinarily be disconnected at a point along its length to allow removable of the severed section and substitution of the replacement section.

The replacement section may be fabricated by securing a repair piece to a piece of the severed section. The repair piece will include the deformable means.

The pipe section to be removed will ordinarily be cut along a circumference by means of sawing or abrasive cutting, i.e. with a grinding wheel, so that the portion of the pipe removed by this means is of sufficient length to allow longitudinal movement of the severed pipe so that it may be removed without disturbing the adjacent fixed ends of the opened high voltage line.

After the removal and the required repair, a piece of the removed tubular structure including an end portion may have a repair piece secured thereto by means such as welding so that the thus formed replacement piece approximates the length of the original piece. It will be understood, however, that the deformable means provides a range of free play which will be necessary to insert and position the replacement section between the adjacent fixed sections. The free play which is required is relatively little and increases with the diameter of the metal pipe. For example, a play of three centimeters is entirely sufficient for the largest casing diameter which can be imagined, i.e. about 1 ½ meters.

The deformable means has a circumferentially extending wall section displaced radially from the surface of the section to form what may be called a metal bellows. Other similar means may be provided.

The replacement section includes lugs on opposite sides of the deformable means whereby the end portions of the replacement section, may, by suitable means, be moved toward and away from each other. When the end portions are moved towards each other as would ordinarily be required when the replacement section is being inserted between the fixed ends of the adjacent sections the deformable means will be compressed. Once the replacement section has been moved into position it is required that it be elongated so that the ends of the replacement section, which mate with the fixed ends of the adjacent sections, may be connected in gas tight relationship. This expansion and contraction of the deformable means may be made possible by connecting a mechanical means between the lugs and operating it as required.

BRIEF DESCRIPTION OF THE DRAWING

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, wherein the FIGURE is a cross sectional elevation illustrating a replacement section in place in an excavation of a portion of a gas insulated high voltage line.

DESCRIPTION OF A PREFERRED EMBODIMENT

As shown in the illustrated embodiment a gas pressure insulated electric high voltage line 1 has a portion thereof exposed by means of an excavated portion 19 in the area in which a problem has been repaired. The line 1 includes an electrical conductor 12 encased by a pipe 2 comprising a plurality of rigid, tubular, metallic casing sections 3, 4, 5 and 6 arranged end to end with the adjacent ends of each interconnected in gas tight relationship. The conductor 12 may be suitably spaced in the pipe 2 in a generally axial position by conventional means and a gas, under pressure, surrounds the conductor 12 and fills the pipe 2. In practice we have found that the pipe 2 may advantageously consist of cylindrically shaped metal tubes. The sections of the metal pipe 3, 4, 5 and 6 may each have a suitable flange means "a" and "b" at opposite ends thereof and these mating flanges may be conventionally connected by connector means such as bolts, etc.

At the end of each of the pipe sections 3, 4, 5 and 6, a tubular extension 10 having a removable gas tight closure may be provided as a handhole through which the connection point between the individual sections of the high voltage conductor 12 may be reached after the pipe 2 has been placed in its final position.

When the pipe 2 is being laid, each of the rigid tubular pieces 3, 4, 5 and 6 is bolted serially to the next one, as for example, from left to right in the FIGURE. The necessary room and free play which is required for mounting is guaranteed because each of the pieces to be laid has a free end even after it is connected at a first end. Since most installations are underground where there is generally little variation in temperature it is ordinarily not required that an expansion compensating means be provided during normal operation. Accordingly, it may be seen that when it is necessary to effect a repair of the line for one reason or another, the section of the pipeline 2 to be repaired, not shown but occupying the same position as shown by section 5, must have a certain clearance to allow its efficient removal whereby repairs may be effected and replacement once the correction has been made. In practice, the free play necessary for the removal of the pipe section will be provided by the means used to sever the casing sections. Thus the pipe section will be severed generally circumferentially into first and second pieces to allow its removal from between the adjacent sections. In practice we have found that the width provided by a cutting tool such as a grinding wheel serves very adequately for this purpose. By this means after the conductor 12 has been detached by means of the handholes 10, the first and second pieces of the section 5 to be replaced may be lifted out of the pit 19 without disturbing the adjacent sections 4 and 6.

After the necessary repair has been made it is required that the section 5 be replaced, again without disturbing the sections 4 and 6. To allow this replacement in an efficient and economical manner we have provided a replacement section 5 variable in length to allow it to be compressed so that it can be inserted into position between the fixed ends 4b and 6a and then expanded to fully fill the opening and assure a gas-tight connection. The connections between the sections are generally indicated at 8.

The replacement section 5 positionable between the fixed ends 4b and 6a of the high voltage line 1 for encasing the high voltage conductor 12 and surrounding pressurized insulating gas comprises a gas tight tubular member having opposite rigid end portion 5c and 5d. Each of the end portions 5c and 5d has end connecting means such as the flanges 5a and 5b, respectively, attached thereto and mateable with the fixed ends 4b and 6a respectively, of the opened line whereby gas tight connections may be effected between the sections 4, 5 and 6. A deformable means 14 is connected between the opposite end portions 5c and 5d whereby the end portions 5c and 5d may be moved toward and away from each other to allow the effective length of the replacement section 5 to be varied to fit between the fixed ends 4b and 6a of the opened line. In practice we have found that the deformable means 14 may advantageously be a circumferentially extending wall section of a "single wave" configuration so that it extends and is displaced radially from the surface of the remainder of section 5. We have also found in practice that the replacement section 5 may be fabricated by securing a prefabricated repair piece 15 to a first piece 5c of the original severed section. The repair piece 15, including the deformable means 14 may be secured in gas tight relationship to the original severed piece 5c by means of a weld 16. This welding may be effected while the repairs to the line are being made so that upon completion of the repairs the replacement section 5 will be ready for installation. The replacement piece 5 thus replaces the previously rigid section and provides the free play required for insertion between the fixed pieces 4 and 6.

The replacement of section 5 and, as shown, the repair piece 15 include lugs 17 secured thereto on opposite sides of the deformable means 14 whereby the end portions may be moved towards and away from each other.

The lug 17 may be configured to allow suitable mechanical means to be positioned across the deformable means 14 and thereby effect compression and expansion of the deformable means as required. It may be seen that the deformable portion 14 would have to be compressed to allow the replacement section 5 to be inserted between the fixed adjacent sections 4 and 6 and that, once in position, the deformable means 14 would have to be expanded so that the end connection means 4b, 5a and 5b 6a will be in mating position and sealed gas tight by means of the connectors 8.

From the foregoing description of our invention it may be seen that we have overcome the disadvantages of the prior art and provided a method and article whereby a gas insulated high voltage line comprising rigid, tubular, metallic casings arranged end to end may be repaired efficiently and economically with a replacement section having a deformable means therein.

Although minor modifications might be suggested by those versed in the art, it should be understood that we wish to embody within the scope of the patent warranted herein all such modifications as reasonably and properly come within the scope of our contribution to the art.

We claim:

1. A method of repairing a gas insulated high voltage line wherein the high voltage line and pressurized insulating gas are encased by a plurality of rigid, tubular, metallic casing sections arranged end to end with the adjacent ends interconnected and gas tight, comprising the steps of severing one of said casing sections generally circumferentially into first and second pieces to allow removal from between the adjacent sections, removing said severed section, effecting the necessary repair, and replacing said severed casing section with a replacement section having a deformable means allowing variation in the length of said replacement section over the range of free play required for insertion and positioning between the adjacent sections.

2. A method of repairing a gas insulated high voltage line according to claim 1 including the step of disconnecting the high voltage line to allow removal of said severed section and substitution of said replacement section.

3. A method of repairing a gas insulated high voltage line according to claim 2 including fabricating said replacement section by securing a repair piece to said first piece of said severed section, said repair piece including said deformable means.

4. A method of repairing a gas insulated high voltage line according to claim 1 wherein the means of severing the section removes a sufficient portion of said severed section to allow sufficient longitudinal movement between said first and second pieces to permit removal.

5. A method of repairing a gas insulated high voltage line according to claim 4 wherein said severing of said section is effected by means of a grinding wheel.

6. A method of repairing a gas insulated high voltage line according to claim 1 including the steps of compressing said deformable portion upon replacement to allow said replacement section to be inserted between said fixed adjacent sections and expanding said deformable means into position in end abutment with said fixed adjacent sections.

7. A method of repairing a gas insulated high voltage line according to claim 6 wherein said replacement section has lug means on opposite sides of said deformable means and wherein said compression and expansion steps are effected by means of a mechanical means interconnected between said lugs.

* * * * *